(12) United States Patent
Mehra et al.

(10) Patent No.: US 6,740,226 B2
(45) Date of Patent: May 25, 2004

(54) PROCESS FOR INCREASING HYDROGEN PARTIAL PRESSURE IN HYDROPROCESSING PROCESSES

(75) Inventors: Yuv Raj Mehra, Dhahran (SA); Ali Hassan Al-Abdulal, Qatif (SA)

(73) Assignee: Saudi Arabian Oil Company, Dharan (SA)

(*) Notice: Subject to any disclaimer, the term of this patent is extended or adjusted under 35 U.S.C. 154(b) by 0 days.

(21) Appl. No.: 10/051,564

(22) Filed: Jan. 16, 2002

(65) Prior Publication Data

US 2003/0132138 A1 Jul. 17, 2003

(51) Int. Cl.$^7$ .................. C10G 47/00; C10G 45/00; C10G 5/00
(52) U.S. Cl. .............. 208/101; 208/103; 208/107; 208/109; 208/254 H; 208/264; 62/617; 423/210; 423/242.1; 423/248; 95/158; 95/172; 95/177; 95/187
(58) Field of Search ................... 208/107, 109, 208/254 H, 264, 101, 103; 62/617; 423/210, 242.1, 248; 95/158, 172, 177, 187

(56) References Cited

U.S. PATENT DOCUMENTS

| | | | |
|---|---|---|---|
| 3,444,072 A | * 5/1969 | Lehman ................. 208/106 |
| 3,598,722 A | 8/1971 | Carson |
| 3,666,658 A | 5/1972 | Hallman |
| 3,718,734 A | 2/1973 | Christensen et al. |
| 3,882,014 A | 5/1975 | Monday et al. |
| 4,367,135 A | 1/1983 | Posey, Jr. |
| 4,457,834 A | 7/1984 | Caspers et al. |
| 4,617,038 A | * 10/1986 | Mehra ................... 62/17 |
| 4,692,179 A | * 9/1987 | Mehra ................... 62/17 |
| 4,740,222 A | 4/1988 | Mehra |
| 4,743,282 A | * 5/1988 | Mehra ................... 62/17 |
| 4,832,718 A | 5/1989 | Mehra |
| 5,082,551 A | 1/1992 | Reynolds et al. |
| 5,414,168 A | * 5/1995 | Scott ................... 585/2 |
| 5,462,583 A | * 10/1995 | Wood et al. .............. 95/192 |
| 5,546,764 A | * 8/1996 | Mehra ................... 62/625 |
| 5,551,972 A | * 9/1996 | Wood et al. .............. 95/192 |
| 5,687,584 A | * 11/1997 | Mehra ................... 62/632 |
| 6,153,086 A | * 11/2000 | Gupta et al. ............... 208/59 |

OTHER PUBLICATIONS

Timothy L. Heckel, Mark E. Reno, "The Uncracking Process Striving for Operational Excellence," National Petroleum Refiners Association, N/A (San Antonio, TX–), (Mar. 17, 1996).

Found on Website www.chevron.com/prodserv/tema/isocracking–2c.htm, "Tailord Catalyst Systems," Website, (Sep. 17, 2001).

Found on Website www.chevron.com/prodserv/tema/isocracking–2a.htm, "Isocracking," Website, (Sep. 17, 2001).

Found on Website www.chevron.com/prodserv/tema/isocracking–2b.htm, "A Clear Upgrade Path," Website, (Sep. 17, 2001).

Article Found on Website www.boucherandjones.com/hydrocracking, "HT Severe Hydrocracking–Clearly Superior," Website, (Sep. 18, 2001).

Groeneveld of Akzo Nobel Chemicals BV; Kirker & Pappal of Mobil Oil; A.R. Gentry & M.G. Hunter of the M.W. Kellogg Company, "Adding Flexibility to Refining by Moderate Pressure Hydrocracking," Article, (Sep. 18, 2001).

Found on Webstie www.r–t–o–1.com/learning/studentguide/hcu.htm, "RTOL Students' Guide," Website, (Sep. 18, 2001).

Found on Website www.syntroleum,com/news/2000pr/08232000.htm, "Syntroleum to Offer Refinging Technology to Licensees," Syntroleum News, Website, (Sep. 18, 2001).

G.F. Froment; B. Delmon; P. Grange, "Hydrotreatment and Hydrocracking of Oil Franctions," Studies in Surface Science and Catalysis, (Feb. 17, 1997).

Found on Website www.chevron.com/prodserv/tema/about–che–tech.htm, "About Chevron's Technology," Article, (Sep. 17, 2001).

R.E.Ayala, "Desulfurization of Hot Coal Gas," Article, Springer–Verlag Berin Heidelberg, (Oct. 24, 1998).

* cited by examiner

*Primary Examiner*—Walter D. Griffin
(74) *Attorney, Agent, or Firm*—Abelman, Frayne & Schwab (57) ABSTRACT

In a hydrocracking unit, the flash gases from the high-pressure separator are fed to the bottom of an absorption zone where the entering gases are counter-currently contacted with a lean solvent. The lean solvent absorbs away the contained methane, ethane, propane, butanes and pentanes ($C_1+$) from the contained hydrogen. The overhead gas stream from the absorption zone typically contains hydrogen at a purity of 90 to 98 mol %, or even higher, which is fed to the recycle gas stream to provide hydrogen purity in the range of 96 to 99 mol %, thereby providing an increase in the overall efficiency of the hydroprocessor unit. The process can also be employed with hydrotreating, hydrodesulfurization, hydrodenitrogenation and hydrodealkylation reactors.

28 Claims, 4 Drawing Sheets

PROCESS FOR INCREASING HYDROGEN PARTIAL PRESSURE IN HYDROPROCESSING PROCESSES

FIELD OF THE INVENTION

This invention relates to improvements in hydroprocesses, such as hydrocracking and hydrotreating processes, used in refinery operations to produce middle distillates, including jet and diesel fuels.

BACKGROUND OF THE INVENTION

In processes for the catalytic conversion of a hydrocarbon feed stock, the step of recycling a hydrogen-rich vapor or gas phase separated from the reaction zone effluent is common. Practical reasons for utilizing this step reside in maintaining both the activity and operational stability of the catalyst used in the process. In hydrogen producing processes, such as catalytic reforming, hydrogen in excess of that required for the recycle feed stream is recovered and utilized in other processes integrated into the overall refinery. For example, the excess hydrogen from a catalytic reforming unit is often employed as the makeup hydrogen in a hydrocracking process, where the reaction principally is hydrogen-consuming.

Regardless of the particular process, the recycled hydrogen is generally obtained by cooling the total reaction product effluent to a temperature in the range of from about 60° F. (15.6° C.) to about 140° F. (60° C.), and introducing the cooled effluent into a vapor-liquid separation zone. The recovered vapor phase required to satisfy the hydrogen requirement of the reaction zone is recycled and combined with the hydrocarbon feed stock upstream of the reaction zone.

The art has long recognized the importance of improving the purity of the hydrogen in the recycle stream of hydroprocessors, such as hydrocracking and hydrotreating units. Thus, it has been the goal of the art to provide enhanced efficiencies of hydrogen utilization with little additional energy consumption and without undue deleterious effects on the maintenance or operation of the hydrocracking equipment. It has also been recognized that by increasing the efficient use of hydrogen, existing equipment could be employed to increase the throughput of the feed stock and also increase the yield of $C_5$ and higher hydrocarbons. A further obvious advantage to the more efficient utilization of hydrogen is the reduction in the amount of hydrogen that must be produced by, for example, a hydrogen plant to ensure that the hydroprocessing zone has sufficient hydrogen of adequate purity to enable the hydroprocessing to proceed in the most advantageous manner. See, for example U.S. Pat. No. 4,362,613 issued Dec. 7, 1982 to Monsanto Company.

In a conventional hydrocracking process, a heavy vacuum gas oil (VGO), which may be additionally mixed with demetalized oil (DMO) or coke-gas oil, is mixed with hydrogen gas to form a feed stream that is introduced under pressure into the top of a catalytic reactor. The VGO liquid and gaseous hydrogen mixture passes downwardly through one or more catalyst beds. The higher the partial pressure of hydrogen in the feedstream to the reactor, the greater will be the efficiency with which the heavier hydrocarbon feedstock is converted to the desired lighter middle distillate products, such as jet fuel and diesel fuel.

After passing through the catalyst, the hot reactor effluent is cooled and passed to a high pressure separator from which the liquid product stream is removed and, if desired, can be subjected to further fractionation.

The flash gases from the HP separator contain hydrogen and $C_1$ to $C_5$ hydrocarbons. These flash gases can contain for example from about 78 to up to 82 mole-percent (mol %) of hydrogen. In the conventional processes of the prior art, the flash gases are combined with a makeup hydrogen stream that is typically available at 96 to 99.99 mol % purity. The recycle gas and, if necessary, the makeup hydrogen streams are compressed and combined with the liquid feed stock at the inlet of the hydrocracking reactor. A portion of up to 2% of the flash gases from the high pressure separator are purged to the refinery fuel gas system to prevent the build-up of the light hydrocarbon products in the reactor gas recirculation loop.

If the heavy VGO feed is sour, i.e., it contains sulfur, the separated effluent gas stream will contain $H_2S$ in addition to the hydrogen and $C_1$ to $C_5$ hydrocarbons. In order to prevent build-up of $H_2S$ in the reactor gas recirculation loop, the flash gases are contacted with an amine solution to remove the $H_2S$ and to sweeten the gas stream. A portion of the sweetened low pressure flash gases are purged to the refinery fuel gas system to prevent build-up of $C_1$ to $C_5$ hydrocarbons in the reactor gas recirculation loop. The remaining sweetened recirculated gases are combined with makeup hydrogen, compressed and passed to the reactor inlet as part of the hydroprocessor feed. Depending upon the $H_2S$ content of the sour gas exiting the reactor, the hydrogen concentration of the sweetened recirculation gas stream can be increased to for example from 80 to 84 mol % hydrogen.

The type of feedstock to be processed, product quality requirements, and the amount of conversion for a specific catalyst cycle life determine the hydrogen partial pressure required for the operation of both types of hydroprocessing units, i.e., hydrocracker and hydrotreater units. The unit's operating pressure and the recycle gas purity determine the hydrogen partial pressure of the hydroprocessing unit. Since there is limited control over the composition of the flashed gas from the downstream HP separator, the hydrogen composition of the recycle flash gas limits the hydrogen partial pressure ultimately delivered to the hydroprocessing reactor. A relatively lower hydrogen partial pressure in the recycle gas stream effectively lowers the partial pressure of the hydrogen gas input component to the reactor and thereby adversely affects the operating performance with respect to distillate quantity and quality, catalyst cycle life, heavier feed processing capability, conversion capability and coke formation. To offset the lower performance, the operating pressure of the hydroprocessing reactor has to be increased. Conversely, by increasing the efficiency of hydrogen gas recovery and hydrogen composition, the hydrogen partial pressure of the recycle gas stream improves thereby improving the overall performance of the hydroprocessing reactor as measured by these parameters.

In the practice of the prior art processes, there are only four ways known to improve the hydrogen partial pressure in the hydrocracker or hydrotreater unit. These are as follows:

1. increasing the hydrogen purity of the makeup stream from the hydrogen unit;
2. purging or venting gas from the high-pressure separator;
3. reducing the temperature at the high-pressure separator to decrease the entrainment of light hydrocarbons in the recycle gas, and
4. improving the hydrogen purity of recycle gas.

All of foregoing methods have a very limited capability for improving the performance of an existing unit. If the hydrogen plant optimizes the purity of the makeup hydrogen, it will be in the 96 to 99 mol % range. Since the high purity $H_2$ makeup flow rate is typically only about one-third or less of the total combined hydrogen fed to the hydroprocessing reactor through recirculation of flashed recycle gas, the overall improvement in the $H_2$ purity or concentration of the combined recycle and makeup gas streams is limited.

Purging or venting gases from the HP separator will result in the loss of some of the hydrogen in the circuit which must eventually be replaced, thereby putting a greater demand on the hydrogen production unit. The extent to which the separator temperature can be lowered is limited by nature of the process and this change has, in any event, a relatively minor effect on recycle gas $H_2$ purity.

It has been recognized that unlike most hydrocarbon gases, hydrogen has the unique property of increasing its solubility in hydrocarbon liquids with increasing temperature. For example, the solubility of hydrogen in a particular oil at 900° F. (482.2° C.) can be five times as great as its solubility in the same oil at 100° F. (37.8° C.). This characteristic is utilized in a process disclosed in U.S. Pat. No. 3,444,072 to Lehman, where the loss of hydrogen dissolved in the liquid effluent from a high-pressure hydrogenation unit is minimized by separating the vapor effluent from the liquid effluent at approximately reaction temperature and pressure, and subsequently flashing the liquid effluent at substantially reaction temperature, but at a lower pressure. The gaseous effluent stream is cooled to ambient temperatures and then contacted in an absorber where it contacts absorber oil in counter-current flow. It is specifically stated that the absorber oil is not subsequently flashed because at ambient temperature the solubility of hydrogen in the absorber oil is not significant, as compared to the overall volumes of hydrogen in the operating system. The overhead absorber gas stream reportedly contains 70–80 volume % hydrogen, which is returned to the reactor in the recycle gas stream and combined with makeup hydrogen. The limited improvement offered by Lehman does not significantly change the hydrogen partial pressure.

Although a variety of processes have been proposed and adopted that are intended to improve the hydrogen utilization efficiency by increasing the purity of the hydrogen in the recycle gas stream, these processes typically result in significant additional equipment costs and/or require significant changes in operating conditions, such as temperature and pressure. The result of changes to the overall process cycle is increased capital and operating expenses.

One process that has been adopted to improve the hydrogen purity of the recycle stream is pressure swing adsorption (PSA). See, for example, U.S. Pat. No. 4,457,384 issued Jul. 3, 1984 to Lummus Crest, Inc. However, in order to incorporate the PSA process, the pressure of the reactor effluent gas stream must be reduced from 2,450 psig (172.2 kg/cm$^2$g) to 350 psig (24.6 kg/cm$^2$g). Although the purity of the recycle hydrogen can be increased to 99 mol %, the recycled gas must be subjected to compression to return it to 2,500 psig (175.8 kg/cm$^2$g) before introduction into the hydroprocessor feed stream. The net result is that the capital, operating and maintenance costs are substantially increased by the addition of a large compressor that is required in the PSA process.

Prior art processes as described in U.S. Pat. No. 4,362,613 to MacLean have used membranes with pressure drops up to 150 atmospheres which incur substantial capital investment and operating costs.

It is therefore an object of this invention to provide an improved process for enhancing the efficiency of hydrogen utilization by means that are compatible with particular existing hydroprocessing units and that does not adversely affect the hydroprocessing throughput or the overall economies of the system, including capital expenditures and operating expenditures, the latter including maintenance and energy consumption.

As previously noted, the overall operating efficiency of the hydroprocessing reactor can be increased if the partial pressure of hydrogen gas in the feed to the reactor can be increased. It is therefore another object of the present invention to improve the operating performance of hydroprocessing units by increasing the through-put capacity of existing hydrocracking and hydrotreating reactors.

Another object of this invention is to improve the operating characteristics for hydrotreating and hydroprocessing in refinery units handling heavier oils.

A further object of this invention is to provide for the enhanced efficiency of hydrogen utilization in high pressure hydrogenation process while minimizing capital expenditures for additional equipment and their related operating expenses.

It is yet another object of this invention to enhance the quality and production rate of low-sulfur middle distillates, such as jet and diesel fuels, obtained from hydroprocessing units operated in accordance with the invention.

As used herein, the terms "hydrogen-rich" and "$C_1$+" are intended to represent relative hydrogen and $C_1$+ concentrations in a particular stream in comparison to the hydrogen and $C_1$+ concentrations in other streams in the process of the present invention.

The terms "hydroprocessing" and "hydroprocessor" are to be understood to include hydroprocesses such as hydrotreating, hydrocracking, hydrodesulfurization, hydrodenitrogenation and hydrodealkylation reactors.

SUMMARY OF THE INVENTION

The improved process of this invention can be employed with hydrotreating, hydrocracking, hydrodesulfurization, hydrodenitrogenation and hydrodealkylation reactors. In the improved process for a hydrocracking unit, the flash gases from the high-pressure separator (HP Separator) are fed to the bottom of an absorption zone where the entering gases are counter-currently contacted with a lean solvent. The lean solvent absorbs away the contained methane, ethane, propane, butanes and pentanes ($C_1$+) from the contained hydrogen. The overhead gas stream from the absorption zone typically contains hydrogen at a purity of 90 to 98 mol %, or even higher.

The partial pressure of hydrogen in the recycle gas stream is significantly improved with hydrogen purity in the range of 96 to 99 mol % by absorption of the hydrocarbon components ($C_1$+) from the HP Separator flash gas stream. The increase in hydrogen partial pressure of the hydrogen gas input component to the hydrocracker results in an increase in the overall efficiency of the hydroprocessor unit.

The rich solvent from the absorption zone containing the $C_1$+ components present in the HP Separator flash gas stream is flash regenerated to form lean solvent in accordance with U.S. Pat. Nos. 4,740,222; 4,832,718, 5,462,583, 5,546,764 and 5,551,972, the disclosures of which are herein incorporated by reference. The lean solvent, comprises predominantly the heavier $C_4$ to $C_5$ hydrocarbons and is returned to the top of the absorption zone (methane absorber).

It is known to the prior art from the description of the Mehra Process® disclosed in U.S. Pat. No. 5,551,972, and others, that the inventory of lean liquid solvent that is required to supply the feed to the absorption zone can be maintained and stabilized by controlling the temperatures at the exit of the liquid coolers. Thus, by monitoring solvent inventory, the volume of the liquid solvent stream lost due to equilibrium at the operating conditions within the absorption zone from lean solvent stream entering the absorption zone is made equal to the $C_4$ to $C_5$ components present in the HP Separator flash gas stream. By maintaining this balance, no makeup solvent is required to replenish the inventory once the process has reached steady-state operating conditions.

Some important advantages of utilizing the Mehra Process in the process of the present invention relate to savings in capital and operating costs. The liquid solvent is regenerated by flashing the absorption zone bottoms stream to reduce pressure in one or more flash drums connected in series, with no external heat added. After the initial batch of solvent charged to start up the process of the invention, no external solvent is required, since the absorption solvent consists predominantly of heavy components supplied by, or present in the hydrocarbon feed to the absorption zone.

Elimination of the need to introduce external solvent to the hydroprocessor system eliminates the possibility of contamination of the reactor feed and catalyst. It further reduces capital investment and operating costs since solvent storage, pumping and metering facilities are not required. The costs and equipment associated with buying, receiving, storing and charging makeup solvent are also eliminated. These advantages and cost savings are particularly significant for hydroprocessing units located in remote areas.

When the heavier liquid hydrocarbon feed to the hydrocracker contains sulfur compounds, the effluent $H_2S$ present in the flash gases from the HP Separator are also absorbed away along with the $C_1+$ components from the $H_2$ recycle gas stream and carried away in the rich solvent stream from the absorption zone. The absorbed gases present in the rich solvent from the absorption zone are separated in the solvent flash regeneration drums of the Mehra Process and contain $H_2S$. Contained $H_2S$ in the separated sour $C_1+$ components stream can be conveniently removed by amine treating in a significantly smaller treating unit. By comparison to known methods of the prior art, this invention requires a significantly smaller amine treating unit than would be required in the conventional process for treating the flash gas stream from the HP Separator. This is because the volume of gas containing the hydrogen sulfide has been greatly reduced by the prior separation and removal of the hydrogen component.

In accordance with the process of this invention, the hydrogen partial pressure of the recycle gas is increased. In a typical unit operation utilizing the process of this invention, the hydrogen concentration can be increased from about 84 mol % achieved in the prior art processes, to a value of from 90 to 99 mol %, or even higher. This improvement is equivalent to a 6 to 15 mol % increase in hydrogen purity. In units which operate at around 2,400 psig (168.7 kg/cm$^2$g), for a 13 mol % increase in hydrogen purity, the increase in hydrogen partial pressure is around 312 psi (21.9 kg/cm$^2$). This increase in the recycle gas purity attributable to the practice of the method of the present invention produces the following advantages in the unit's operation:

1. higher product yields;
2. better distillate quality;
3. longer catalyst cycle life;
4. heavier feed processing capability;
5. higher conversion capability;
6. prevention of coke formation; and
7. improved feed distribution over catalyst bed.

The significance and effect of these advantages will be further discussed in the context of a hydrocracking unit.

11 Higher Product Yields

Operating at higher hydrogen partial pressures will result in lower start-of-run (SOR) temperatures, and a lower average bed temperature throughout the cycle. Doing so will increase the liquid product yield by about 4% and reduce lower-value gas make.

2. Better Distillate Quality

Higher hydrogen partial pressure improves the jet, diesel and unconverted oil quality. The estimated improvement in product quality by increasing the hydrogen partial pressure by 312 psi (21.9 kg/cm$^2$) is estimated as follows:

a. Cetane Number improved by about 3 to 4; and
b. Aniline point improved by about 13° F. (7.2° C.) to 17° F. (9.4° C.).

3. Longer Catalyst Cycle Life

Higher hydrogen partial pressure results in an increase in the catalyst cycle life. The catalyst cycle life is determined for any given unit by the Start of Run (SOR) and the End of Run (EOR) temperature and the deactivation rate of the catalyst. SOR temperature is a function of the catalyst activity, unit pressure and the type of feed being processed. The catalyst cycle life is also a function of catalyst stability, which is measured in terms of deactivation rate (° C. or ° F. per month). EOR temperature is determined by the reactor's metallurgy or the unit's economics (yield). Increasing the hydrogen partial pressure b)y 312 psi (21.9 kg/cm$^2$) produces the following benefits:

a. Improved catalyst stability (relative deactivation rate) by about 70%. This is a major improvement for the catalyst cycle length. In a unit with 2 years cycle length, this improvement will increase cycle length to more than 3 years.
b. SOR temperature will be lowered by about 5° C. to 6° C. (9° F. to 11° F.), which is equivalent to about a 2 to 3 month increase in cycle length, depending upon the deactivation rate of the catalyst.
c. Catalyst Activity, measured in delta temperature required, will be improved by about 1° C. (1.8° F.) to 1.5° C. (2.7° F.) for every 10 psi (0.7 kg/cm$^2$). Therefore, with a 312 psi (21.9 kg/cm$^2$) increase in hydrogen partial pressure, the total improvement will be about 30° C. (54° F.) to 35° C. (63° F.) in average bed temperature.

All of these factors are related, but not cumulative, and the total increase in cycle life for a 2-year cycle length unit will be about one year in the cycle length for the unit. Thus a 50% increase in production is achieved.

4. Heavier Feed Processing Capability

Increasing the hydrogen partial pressure enables the unit to run more heavy feed. For example where the hydrocracker feed is limited to 15% DMO 85% VGO under prior art conditions, this percentage can be increased with the higher hydrogen partial pressure obtainable through the practice of the invention. While the particular catalyst employed will have an effect on the quantity of the increase, a minimum increase of about 5% in DMO processing capacity, i.e., 20% DMO 80% VG, can be expected.

5. Higher Conversion Capability

With the improved hydrogen partial pressure, the hydrocracker conversion can increase from 96% to 98%. Additionally, poly-nuclear aromatics (PNA) build-up will be reduced and consequently the drag stream will be less.

6. Prevention of Coke Formation

The tendency to form coke is substantially reduced with an increase in hydrogen partial pressure in the reactor. Availability of more hydrogen reduces the hydrocarbon condensation in catalyst pores and subsequent plugging of the active sites on the catalyst.

7. Improved Feed Distribution Over Catalyst Bed

With higher hydrogen partial pressure feed distribution is substantially improved due to lower molecular size of gases which, in turn significantly reduces flow maldistribution and formation of hot spots in the reactor.

As will be apparent to one of ordinary skill in the art from the above analysis, the financial benefits associated with the practice of the invention are also significant. For example, a typical hydrocracker with a rated capacity at 30,000 BPD can achieve an improvement in total annual revenues from the incorporation of over $17 MM/yr in current dollars by adopting the process of this invention.

BRIEF DESCRIPTION OF THE DRAWINGS

The invention will be further described with reference to the attached drawings in which like elements are referred to by the same numbers and where.

DETAILED DESCRIPTION OF THE PREFERRED EMBODIMENTS

Since the invention provides a substantial improvement over the processes of the prior art, it is appropriate to describe a typical and representative hydroprocess as currently practiced, and to relate its limitations in order to provide an enhanced understanding and appreciation of the advantages of this invention. In this context, FIGS. 1 and 2 are provided as schematic illustrations of representative prior art hydrocracking units of a type utilized to provide middle distillates such as jet fuel and diesel fuel.

As will be understood by those of ordinary skill in the art, various modifications to the process, apparatus, catalysts and operating conditions and steps are possible within the basic elements of the unit operation described. In this regard, a number of competitive hydrocracking technology packages are commercially available from petroleum engineering and refining companies. Many of these commercial processes are proprietary and are specifically designed and adapted for use under particular operating conditions and with specified feed stocks. The following description of the prior art hydrocracking processes is intended to be general and illustrative to one of ordinary skill in the art.

Figure 1:
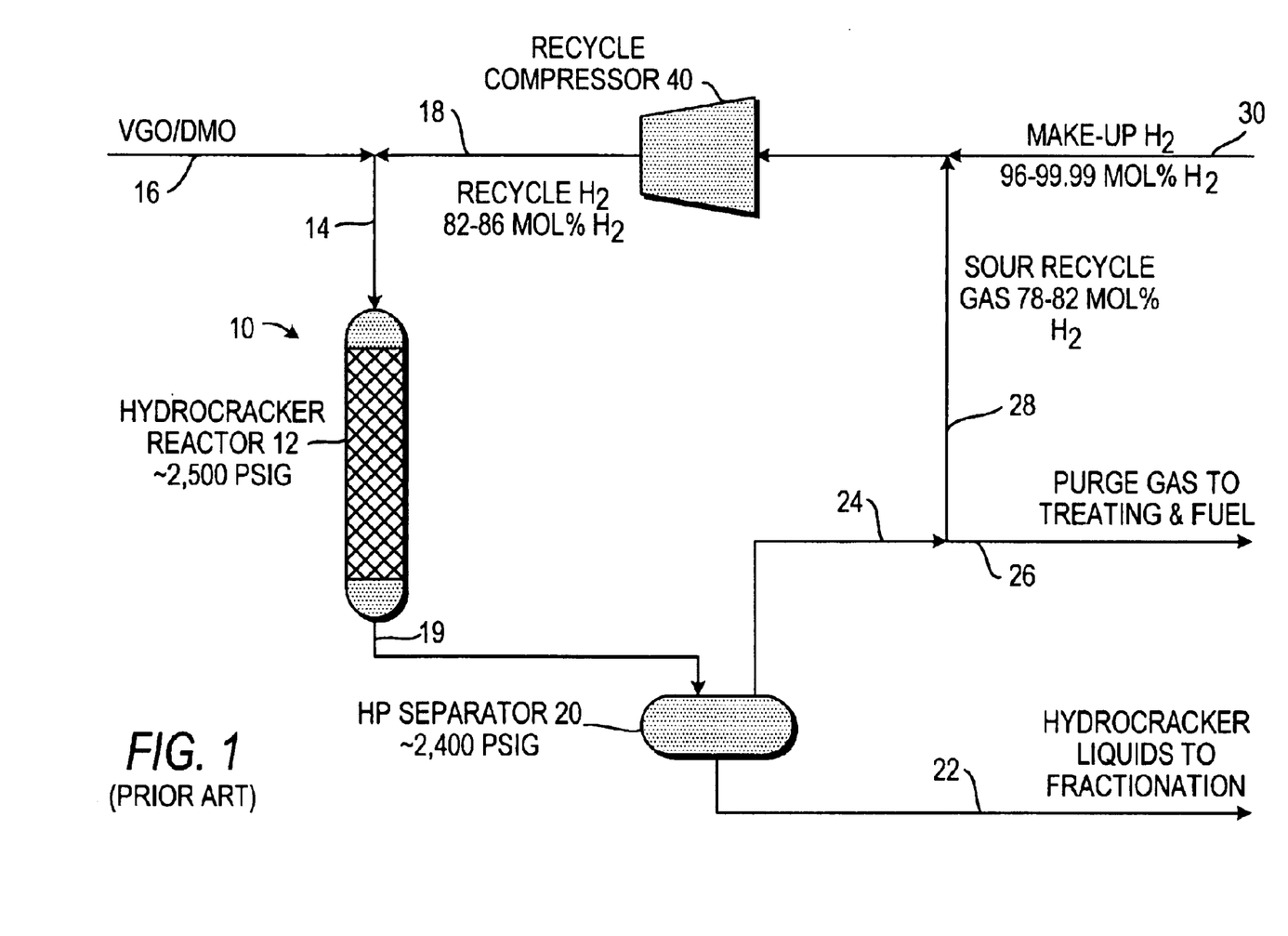
FIG. 1 is a simplified schematic representation of a hydrocracking plant of the prior art.
Figure 2:
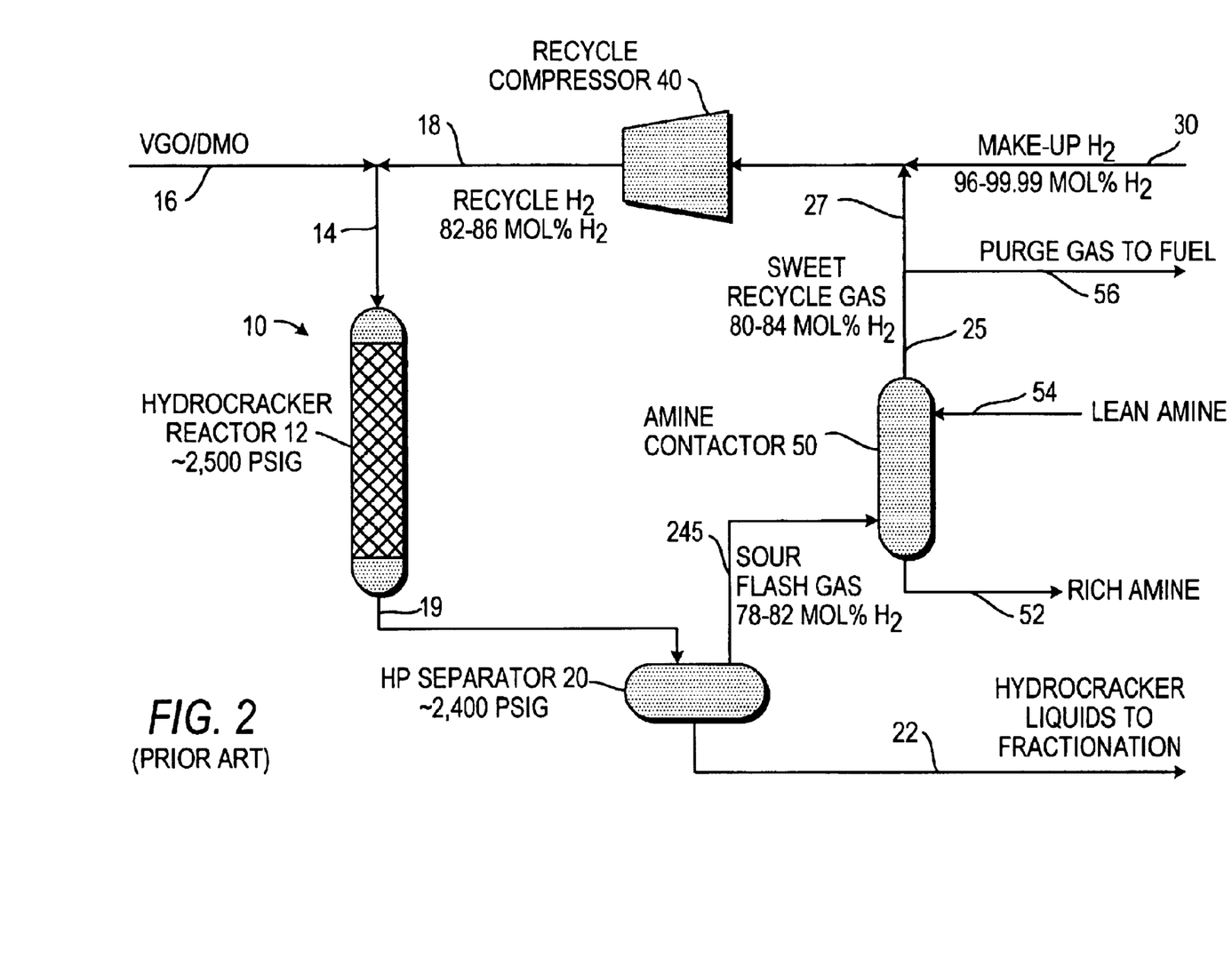
FIG. 2 is a schematic representation of a typical hydrocracking plant of the prior art similar to FIG. 1 with the addition of a sour gas treatment unit to remove hydrogen sulfide from the recycle gas stream.

With reference to FIG. 1, there is schematically shown a hydrocracker reactor 10 containing catalyst 12 that receives a feed stock stream 14 formed from (a) a heavy hydrocarbon liquid component 16 that is comprised of vacuum gas oil (VGO) and demetalized oil (DMO), and (b) a hydrogen gas input component 18. The hydrogen gas input component 18 comprises a recycle gas stream 28 and a makeup gas stream 30, the latter typically originating in a hydrogen generation unit (not shown) that is dedicated, at least in part, to this makeup stream. Thus, the design capacity of the hydrogen generation unit must be great enough to satisfy the maximum requirements of the reactor 10, taking into account the quantity or purity of the hydrogen provided by the recycle stream 28 with which it is combined to form the hydrogen feed component 18. Thus, any improvement in the purity of the hydrogen in the recycle gas stream will have a positive effect of the overall efficiency of the unit operation through hydrogen input stream 18, combined reactor feed stream 14 and the hydrocracking reactor 10 utilizing catalyst 12.

The reactor effluent stream 19 is at least a two-phase stream containing cracked hydrocarbon vapor and cracked hydrocarbon liquid and unreacted hydrogen. The reactor effluent stream 19 passes to high pressure separator (HP Separator) 20 which operates at a pressure only slightly reduced from that of the reactor 10. In a typical hydrocracking operation the reactor is maintained at about 2,500 psig (175.8 kg/cm$^2$g) and the HP separator operates at about 2400 psig (168.7 kg/cm$^2$g). The liquid stream 22 removed from the HP Separator 20 contains the hydrocracked products and is passed to product fractionation.

The vapor stream 24 withdrawn from the HP separator 20 contains the unreacted hydrogen, as well as a minor proportion of methane, ethane, propane, butanes and pentanes, sometimes referred to hereinafter as $C_1$+. The flashed gases from HP Separator 20 in stream 24 contain for example from about 78–82 mol % hydrogen.

In the illustration of FIG. 1, the process also includes a diversion of a portion of the high pressure gas stream 24 in the form of purge gas stream 26. The purge gas stream is required to eliminate a portion of the $C_1$+ hydrocarbon to avoid a build-up of these components in the system. However, it will be understood that the purge gas stream is approximately 80 mol % hydrogen, and that this hydrogen is lost from the system and that it must be replaced by the makeup hydrogen stream 30.

With continuing reference to FIG. 1, the reduced recycle gas stream 28 is combined with the makeup hydrogen gas stream 30 to form hydrogen input feed component stream 18 fed to reactor 10 via stream 14. The makeup hydrogen gas stream 30 is typically supplied at a purity of 96 to 99.99 mol % hydrogen. The combined input component stream 18 of the prior art process can contain from 82–86 mol % hydrogen, and typically averages about 84 mol % hydrogen.

In a typical hydrocracking system (not shown in FIGS. 1, 2, 3 and 4, but known to one of ordinary skill in the art) the system employs one of the following:

1. the reactor effluent stream 19 is cooled to ambient temperatures prior to vapor-liquid separation in HP Separator 20 and the separated ambient temperature gases become the recycle hydrogen gas under stream 28 and the ambient temperature liquid product flows as part of stream 22 to product fractionation; or 2. the HP Separator 20 is a high-pressure, high-temperature separator, and the separated gases in stream 24 are further cooled to ambient temperatures and any condensed liquids produced by the cooling are separated from ambient temperature gases in a high pressure ambient temperature (HPAT) separator (not shown) thereby forming the ambient temperature recycle gas stream under stream 28 and ambient temperature liquids separated in HPAT separator flow to product fractionation as under stream 22; or 3. a combination of process steps 1 and 2 above, comprising partial cooling and partial separation with the objective of separating a high-pressure, ambient temperature recycle hydrogen gas stream under stream 28.

Depending upon the relative pressures of each stream, the makeup and recycle gas streams are commonly combined in either a single or a multi-stage compressor 40 upstream of the reactor 10. The recycle gas stream 28 enters the compressor at about 2,400 psig (168.7 kg/cm$^2$g) and 100 to 140° F. (37.8 to 60° C.). The combined hydrogen gas component exits the compressor at the reactor operating pressure, which in this representative example is about 2,500 psig (175.8 kg/cm$^2$g).

Prior Art Sulfur Removal

If the heavy hydrocarbon liquid component being fed to the hydrocracker includes sulfur-containing compounds, as is most common, the flash gas stream 24 will contain a minor portion of hydrogen sulfide gas. In order to avoid a build-up of hydrogen sulfide in the system and its deleterious effects on the catalyst, it must be removed.

As schematically illustrated in the prior art process of FIG. 2, this entire sour flash gas stream 24S is passed to an amine contact zone 50. The sour flash gas 24S is typically contacted with an amine solution in counter-current flow, the lean amine solution 54 entering the top of the contactor 50 and the rich amine solution 52 containing the sulfur being withdrawn from the bottom of the zone 50. In a further processing of the rich amine solution 52, which forms no part of the present invention, the sulfur is eventually recovered for its commercial value as elemental sulfur and the regenerated sweet lean amine solution is returned as stream 54 to zone 50.

With continuing reference to. FIG. 2, the sweet recycle gas stream 25 leaving zone 50 contains for example from about 80 to 84 mol % hydrogen, the relatively purity having been increased by the removal of the sour hydrogen sulfide component. In a typical process, a minor portion of the sweet recycle gas is withdrawn as purge gas stream 56. The purge gas can be used as refinery fuel or further processed, which process steps form no part of the present invention. However, as in the example of FIG. 1, the purge gas also contains hydrogen which is lost to the unit operation, and must be replaced in the makeup stream 30.

The remaining recycle gas stream 27 downstream of the purge gas take-off is passed to a compressor 40, and this and the subsequent processing steps are essentially the same as described above in connection with FIG. 1.

It will be understood that the hydrogen gas input component stream 18 of FIG. 2 will typically have a purity that is at the higher end of the 82 to 86 mol % hydrogen range, due to the relatively higher purity of the sweet recycle gas stream 27 as compared to recycle gas stream 28 of FIG. 1.

In both of the prior art processes described with references to FIGS. 1 and 2, the balance of gases in the recycle streams 28 and 27 are respectively, principally $C_1$ to $C_5$ hydrocarbons. These gases pass through the HP separator 20 and build up in the system. The standard approach to this problem by the prior art has been to purge a small portion of the recycle gas stream, which as previously noted, also results in a loss of hydrogen from the system.

In typical prior art processes such as those described with reference to FIGS. 1 and 2, the separated high-pressure liquid product streams as represented by stream 22, whether they are at high temperatures or ambient temperatures, are conventionally cooled and let down in pressure in order to separate the lighter hydrocarbons from the cracked hydrocarbon liquid product, such separation taking place in low pressure (LP) vapor-liquid separators to produce separated LP gases and LP liquids. It should be understood that such LP gases contain hydrogen and can be compressed and recycled back to reactor 10 after processing through compressor 40 through stream 18 and stream 14. It should be further understood that this operating process configuration is quite suitable to the improved process of this invention.

A first preferred embodiment of the invention will be described with reference to FIG. 3. It will be understood that the process reactor 10 and HP separator 20 operate under conditions as described above in reference to FIGS. 1 and 2, respectively. The same reference numbers are used to describe common elements and like process streams.

In accordance with the improved process of this invention, the effluent from the hydroprocessing reactor 10 passes through a high-pressure separator 20 from which the effluent liquid stream 22 and the effluent gas or vapor stream 24 are removed as described above. The ambient temperature effluent gas stream 24 comprises unreacted hydrogen and methane and heavier hydrocarbons, the latter components referred to as $C_1$+. The ambient temperature gas stream 24 is chilled by passing through heat exchanger 60 and refrigerant chiller 61 to a temperature in the range of between 30° F. (−1.1° C.) and −40° F. (−40° C.), preferably in the temperature range of 0° F. (−17.8° C.) and −20° F. (−28.9° C.), and most preferably in the temperature range of −10° F. (−23.3° C.) and −15° F. (−26.1° C.). The lower temperature limit is determined by the carbon steel metallurgy suitable for the refinery system. The chilled effluent gas stream 25 and any liquid condensate formed by the chilling process in heat exchangers 60 and 61 is counter-currently contacted with a lean liquid solvent stream 74 in an absorption zone 70, whereby the methane and heavier hydrocarbons are absorbed from the chilled gas stream 25 to produce a hydrogen-rich gas stream 76 containing hydrogen at a purity of 90 to 99 mol %, or higher. The liquid effluent from absorption zone 70 is a rich liquid solvent stream 72 that contains the absorbed $C_1$+ hydrocarbons present in stream 24.

The hydrogen-rich gas stream 76, which constitutes the recycle gas stream, chills the ambient temperature flash gases in stream 24 from HP Separator 20 in heat exchanger 60. Depending upon the relative pressures of stream 76 and stream 30, the hydrogen-rich recycle stream 76 is combined with the hydrogen make-up stream 30 either after compressor 40 or compressed together in compressor 40 and forms the hydrogen input stream 18 that is added to the reactor feed stream 16 at an operating pressure of, e.g., 2,500 psig (175.8 kg/cm$^2$g).

The rich liquid solvent stream 72 from the bottom of absorption zone 70 is passed to at least one flashing stage 80, but preferably to a plurality of sequential flash drums. Through pressure let down in flash drums, the flash gas stream 86 containing absorbed $C_1$+ hydrocarbon components is separated to form the preferred lean liquid solvent stream 82 comprising $C_4$ and $C_5$ components that are present in the HP Separator gas stream 24. The temperature of the lean solvent stream 82 is lower than rich-solvent stream 72. The cold lean solvent stream 82 is returned to the top of absorption zone 70 after being chilled in a refrigerant chiller (not shown) as the chilled lean solvent stream 74.

The absorption zone 70 can comprise of a column with at least one mass-transfer packed sections or fitted with mass-transfer trays in which the chilled effluent gas stream 25 containing hydrogen is passed upward in counter-current flow to the chilled lean liquid solvent stream 74. A further preferred embodiment of the invention will be described with reference to the schematic process flow diagram of FIG. 4. In this embodiment, the feed stock 16 to a hydrocracker contains sulfur compounds. In this embodiment, the separated high-pressure ambient temperature effluent gas stream 24 will contain hydrogen sulfide. In the practice of the process of this invention as described above, the hydrogen sulfide will also be absorbed in the lean liquid solvent 74 with the $C_1+$ hydrocarbon components. In this case, the recycled gas stream 76 is sweetened in the absorption zone 70 and therefore requires no amine treatment as is typical in the processes of the prior art.

Figure 4:
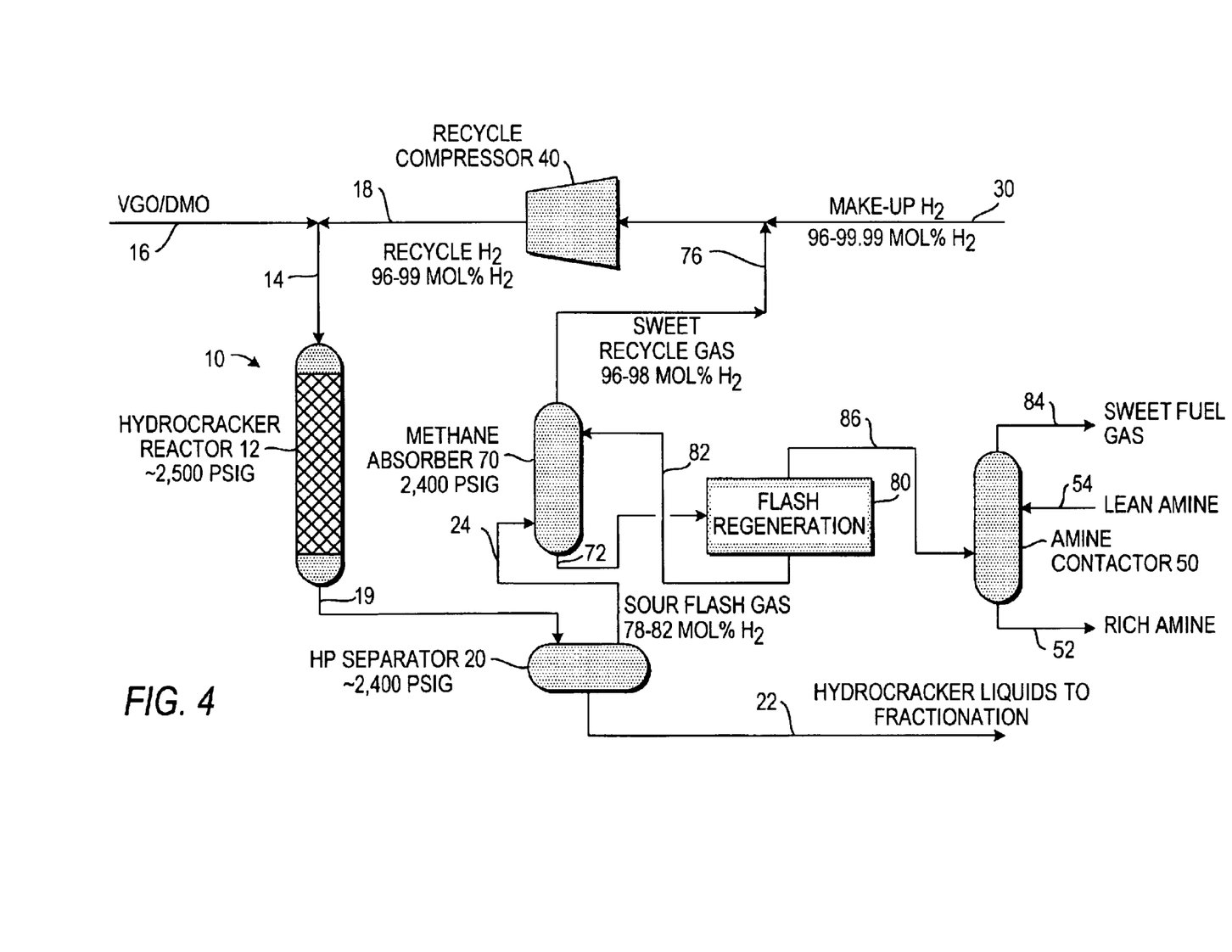
FIG. 4 is a schematic representation of another embodiment of an improved hydrocracking plant similar to FIG. 3 which includes a sour gas treatment zone for removing hydrogen sulfide from the process gas stream.

The rich-solvent liquid absorber effluent stream 72 containing the hydrogen sulfide and the $C_1+$ components is passed to one or more flash regeneration units 80. Following the flash regeneration step, the lean liquid solvent is withdrawn from stream 82 and delivered to the top of the absorption zone 70 as chilled stream 74.

The sour flash gas stream 86 containing the hydrogen sulfide and $C_1+$ components is passed to amine treatment zone 50S to remove the hydrogen sulfide from the gas. The sweetened $C_1+$ gas stream 88 removed from the amine contact zone 50S can be used as sweet refinery fuel or passed for further processing and/or separation of its components. The sulfur-rich liquid amine stream 56 is processed in accordance with well known methods to recover sulfur and the lean liquid amine stream 58 is returned to the amine contact zone 50S.

Since the flow rate of stream 86 of FIG. 4 in the improved process of this invention is significantly smaller than the flow rate of stream 24S of the prior art processes, the amine treatment requirements for amine zone 50S in the process of this invention are substantially lower than those of amine zone 50 in prior art processes. However, it should be understood with reference to FIG. 3 that the process of this invention can be effectively utilized downstream of an amine treatment zone 50 in accordance with FIG. 2, whereby the HP Separator flash gas stream 24S is sweetened prior to the absorption of $C_1+$ components in absorption zone 70 in accordance with the process of FIG. 3 or 4.

Figure 3:
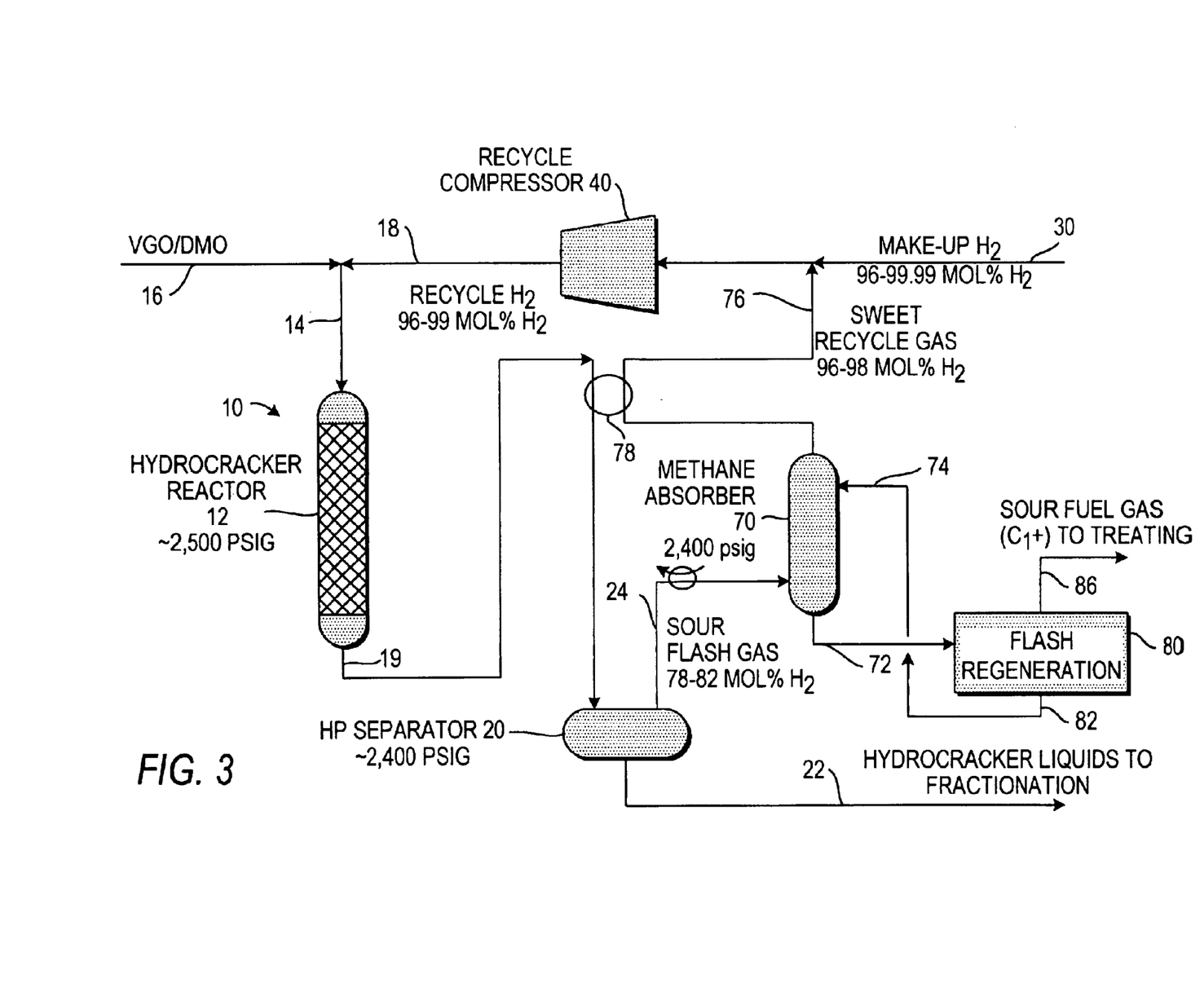
FIG. 3 is a schematic representation of one embodiment of an improved hydrocracking plant in accordance with the invention.

As previously described under prior art processes in accordance with FIG. 1 and FIG. 2 wherein the HP Separator liquid stream 22 is let down in pressure to separate additional hydrogen from LP separators to form LP gases that are recycled back to reactor 10, these separated gases can be compressed and co-processed in absorption zone 70 of FIG. 3 or FIG. 4, or separately processed in a low-pressure absorption zone 70LP (not shown) whereby low pressure 90–99 mol % hydrogen is produced from absorption zone 70LP. This low pressure, higher purity hydrogen stream may then be compressed and combined with recycle stream 76 of FIG. 3 or FIG. 4 for returning to reactor 10.

From the above description it will be understood that the invention relates broadly to an improvement in the process for hydrogenating a feedstream in a hydroprocessing reactor, the feedstream comprising a heavy hydrocarbon liquid component and a hydrogen gas input component, the hydrogen gas input component comprising a recycle gas stream and a makeup gas stream, the reactor producing an effluent liquid stream and an effluent gas stream, the effluent gas stream comprising unreacted hydrogen and methane and heavier hydrocarbons, the improvement comprising:

a) cooling the separated effluent gas stream to a temperature in the range of +30° F. (−1.1° C.) to −40° F. (−40° C.);

b) counter-currently contacting the cooled effluent gas stream with a lean liquid solvent stream in an absorption zone to absorb the methane and heavier hydrocarbons from the effluent gas stream to produce a hydrogen-rich gas stream containing 90 to 99 mol % hydrogen and a rich liquid solvent stream;

c) recovering the hydrogen-rich gas stream from the absorber zone;

d) adding the hydrogen-rich gas stream to the hydroprocessing reactor feedstream as the recycle gas stream; and e) flashing the rich liquid solvent stream in at least one flashing stage to produce the lean liquid solvent stream comprising $C_4$ to $C_5$ components present in the separated effluent gas stream for contacting the cooled effluent gas stream in step (b), and a methane and heavier hydrocarbon gas product stream.

In an alternative embodiment of this process, where the heavy hydrocarbon liquid component feed contains sulfur and the methane and heavier hydrocarbon gas product stream obtained in step (e) contains hydrogen sulfide, the process includes following step (e) the further steps of:

f) contacting the methane and heavier hydrocarbon gas product with a lean amine solution in a treatment zone for removing the hydrogen sulfide and thereby providing a sweetened methane and heavier hydrocarbon gas product;

g) recovering the $H_2S$-rich amine solution from the treatment zone; and h) passing the $H_2S$-rich amine solution through a regeneration column for producing a lean amine solution for contacting in step (f).

In yet an another embodiment, where the heavy hydrocarbon liquid component feed contains sulfur, and the separated effluent gas stream comprising unreacted hydrogen and methane and heavier hydrocarbons contains hydrogen sulfide, the process includes the further steps of:

i) contacting the separated effluent gas stream with a lean amine solution in a treatment zone to remove the hydrogen sulfide and thereby provide a sweetened hydrogen and methane and heavier hydrocarbon gas stream for cooling in step (a);

j) recovering the $H_2S$-rich amine solution from the treatment zone; and k) passing the $H_2S$-rich amine solution through a regeneration column for producing a lean amine solution for contacting in step (i).

In the practice of the process of this invention, the hydroprocessing reactor is selected from the group consisting of hydrodesulfurization, hydrocracking, hydrodenitrofication, hydrodealkylation and hydrotreating reactors. When the hydroprocessing reactor is a hydrocracking reactor, the reactor operates at a pressure in the range of 500 psig (35.1 kg/cm$^2$g) to 5,000 psig (351.5 kg/cm$^2$g), more preferably in the range of 1,000 psig (70.3 kg/cm$^2$g) to 3,000 psig (210.9 kg/cm$^2$g). When the reactor is selected from the group consisting of hydrodealkylation and hydrotreating, the reactor operates at a pressure in the range of 200 psig (14.1 kg/cm$^2$g) to 3,000 psig (210.9 kg/cm$^2$g).

In another embodiment of this invention, the effluent liquid product and gas streams from the reactor are passed through a high pressure separator operating at a pressure in the range of 200 psig (14.1 kg/cm$^2$g) to 5,000 psig (351.5 kg/cm$^2$g), more preferably at a pressure in the range of 200 psig (14.1 kg/cm$^2$g) to 3,000 psig (210.9 kg/cm$^2$g).

In a further embodiment, the effluent gas stream and lean liquid solvent stream are contacted in an absorber zone at a pressure in the range of 200 psig (14.1 kg/cm²g) to 5,000 psig (351.5 kg/cm²g), more preferably at a pressure range of 200 psig (14.1 kg/cm²g) to 3,000 psig (210.9 kg/cm²g).

The process of this invention is operated to provide the hydrogen gas input component of the reactor feed stream which contains 90–99 mol % hydrogen, and the makeup gas stream contains 70 to 99 mol % hydrogen.

In the improved process, the separated effluent gas stream is chilled to a temperature between 0° F. (−17.8° C.) and −20° F. (−28.9° C.), more preferably the effluent gas stream is cooled to a temperature in the range of −10° F. (−23.3° C.) to −15° F. (−26.1° C.).

In the practice of the process of the invention where the separated effluent gas stream contains water, the separated effluent gas stream is co-chilled with ethylene glycol and the ethylene glycol/water mixture is separated from the chilled hydrocarbon gas and hydrocarbon liquid streams prior to entering the methane absorber.

The process of the invention is particularly useful when the heavy hydrocarbon component is selected from the group consisting of naphtha, kerosene, diesel, light vacuum gas oil, heavy vacuum gas oil, demetalized oil, coke-gas oil resid, fuel oil and aromatics.

In another preferred embodiment, the recovered hydrogen-rich gas stream from an absorption zone is further cross-heat exchanged with the reactor effluent gas stream prior to compression for recycling to hydroprocessing reactor.

In a preferred embodiment, the lean liquid solvent stream enters the absorption zone at a temperature in the range of +30° F. (−1.1° C.) to −40° F. (−40° C.), more preferably at a temperature in the range of 0° F. (−17.8° C.) to −20° F. (−28.9° C.), and most preferably at a temperature in the range of −10° F. (−23.3° C.) to −15° F. (−26.1° C.).

In a further embodiment, the rich liquid solvent stream passes through at least two successive flash separators, wherein the separated gases from the first of the successive flash separators are compressed and returned to the absorption zone as stripping gas. For solvent regeneration, the flash separators are gas-liquid 2-phase separation drums, and the successive flash separators are operated at successively lower pressure than the operating pressure in the absorption zone.

In another embodiment of this invention, the separated liquid product from the high pressure separator is let down in pressure to produce a low pressure liquid and gas stream. The low pressure liquid and gas stream is separated in a low pressure separator to produce a low pressure hydrogen-rich gas stream. The low pressure hydrogen-rich gas stream is either (i) compressed and chilled prior to entering the absorption zone of step (b) for co-processing; or (ii) chilled and contacted with a lean solvent stream comprised of $C_4$ to $C_5$ to components present in the reactor effluent gas stream to produce a low pressure high-purity hydrogen recycle stream containing 90 to 99 mol % hydrogen.

Since numerous modifications and variations of the present invention will be apparent to those of ordinary skill in the refinery process art in light of the above teachings and, therefore, are within the scope of the appended claims, the invention can also be practiced otherwise than as particularly described.

We claim:

1. In a process for hydrogenating a feedstream in a hydroprocessing reactor, the feedstream comprising a heavy hydrocarbon liquid component and a hydrogen gas input component, the hydrogen gas input component comprising a recycle gas stream and a makeup gas stream, the reactor producing an effluent liquid stream and a separate effluent gas stream, the effluent gas stream comprising unreacted hydrogen and methane and heavier hydrocarbons, the improvement comprising:
   a) cooling the separated effluent gas stream to a temperature in the range of +30° F. (−1.1° C.) to −40° F. (−40° C.);
   b) contacting the cooled effluent gas stream with a leak liquid solvent stream comprising $C_4$ to $C_5$ hydrocarbon components in an absorption zone to absorb the methane and heavier hydrocarbon from the effluent gas stream to produce a hydrogen-rich gas stream containing 90 to 99 mol % hydrogen and a rich liquid solvent stream;
   c) recovering the hydrogen-rich gas stream from the absorption zone;
   d) adding the hydrogen-rich gas stream to the hydroprocessing reactor feedstream as the recycle gas stream; and
   e) flashing the rich liquid solvent stream in at least one flashing stage to produce the lean liquid solvent stream comprising $C_4$ to $C_5$ hydrocarbon components present in the separated effluent gas stream for contacting the cooled effluent gas stream in step (b), and to produce a methane and heavier hydrocarbon gas product stream.

2. The process of claim 1, wherein the hydroprocessing reactor is selected from the group consisting of hydrodesulfurization, hydrocracking, hydrodenitrification, hydrodealkylation and hydrotreating reactors.

3. The process of claim 2, wherein the reactor is a hydrocracking reactor operating at a pressure in the range of 500 psig (35.1 kg/cm²g) to 5,000 psig (351.5 kg/cm²g).

4. The process of claim 3, wherein the hydrocracking reactor is operating at a pressure in the range of 1,000 psig (70.3 kg/cm²g) to 3,000 psig (210.9 kg/cm²g).

5. The process of claim 2, wherein the reactor is selected from the group consisting of hydrodealkylation and hydrotreating, and the reactor is operating at a pressure in the range of 200 psig (14.1 kg/cm²g) to 3,000 psig (210.9 kg/cm²g).

6. The process of claim 2 wherein the effluent liquid product and gas streams from the reactor are passed through a high pressure separator operating at a pressure in the range of 200 psig (14.1 kg/cm²g) to 5,000 psig (351.5 kg/cm²g).

7. The process of claim 2, wherein the effluent gas stream and lean liquid solvent stream are contacted in the absorption zone at a pressure in the range of 200 psig (14.1 kg/cm²g) to 5,000 psig (351.5 kg/cm²g).

8. The process of claim 7, wherein the effluent gas stream and lean liquid solvent stream are contacted in the absorption zone at a pressure in the range of 200 psig (14.1 kg/cm²g) to 3,000 psig (210.9 kg/cm²g).

9. The process of claim 1, wherein the hydrogen gas input component of the rector feed stream contains 90–99 mol % hydrogen.

10. The process of claim 2, wherein the heavy hydrocarbon liquid component feed contains sulfur, and the methane and heavier hydrocarbon gas product stream obtained in step (e) contains hydrogen sulfide, the process including the further steps following step (e) of:
   f) contacting the methane and heavier hydrocarbon gas product with a lean amine solution in a treatment zone for removing the hydrogen sulfide and thereby providing a sweetened methane and heavier hydrocarbon gas product;
   g) recovering the $H_2S$-rich amine solution from the treatment zone; and h) passing the H₂S-rich amine solution through a regeneration column for producing a lean amine solution for contacting in step (f).

11. The process of claim 1, wherein the separated effluent gas stream is chilled to a temperature between 0° F. (−17.9° C.) and −20° F. (−28.9° C.).

12. The process of claim 11, wherein the effluent gas stream is cooled to a temperature between −10° F. (−23.3° C.) to −15° F. (−26.1° C.).

13. The process of claims 1 or 11, wherein the separated effluent gas stream contains water and the separated effluent gas stream is co-chilled with ethylene glytol and the ethylene glycol/water mixture is separated from the chilled hydrocarbon gas and hydrocarbon liquid streams prior to entering the absorber.

14. The process of claim 1, wherein the heavy hydrocarbon component is selected from the group consisting of naphtha, kerosene, diesel, light vacuum gas oil, heavy vacuum gas oil, demetalized oil, coker gas oil, resid, fuel oil and aromatics.

15. The process of claim 1, wherein the makeup gas stream contains 70 to 99 mol % hydrogen.

16. The process of claim 1, wherein the recovered hydrogen-rich gas stream from the absorption zone is further cross heat exchanged with the reactor effluent gas stream.

17. The process of claim 1, wherein the cooled effluent gas stream is contacted in step (b) with the lean liquid solvent stream in counter-current flow.

18. The process of claim 1, wherein the lean liquid solvent scream enters the absorption zone at a temperature in the range of +30° F. (−1.1° C.) to −40° F. (−40° C.).

19. The process of claim 18, wherein the lean liquid solvent stream enters the absorption zone at a temperature in the range of 0° F. (−17.8° C.) to −20° F. (−28.9° C.).

20. The process of claim 19, wherein the lean liquid solvent stream enters the absorption zone at a temperature in the range of −10° F. (−23.3° C.) to −15° F. (−26.1° C.).

21. The process of claim 1, wherein the rich liquid solvent stream passes through at least two successive flash separators.

22. The process of claim 21, wherein the separated gases from the first successive flash of the at least two separators are compressed and returned to the absorption zone of step (b).

23. The process of claim 21, wherein the flash separators are gas-liquid two-phase separation drums.

24. The process of claim 21, wherein the at least two successive flash separators operate at successively lower pressure than the operating pressure in the absorption zone.

25. The process of claim 2, wherein the heavy hydrocarbon liquid component feed contains sulfur, and the separated effluent gas stream comprising unreacted hydrogen and methane and heavier hydrocarbons contains hydrogen sulfide, the process including the further steps of:

(i) contacting the separated effluent gas stream with a lean amine solution in a treatment zone for removing the hydrogen sulfide and thereby providing a sweetened hydrogen and methane and heavier hydrocarbons gas stream for cooling in step (a);

(i) recovering the H₂S-rich amine solution from the treatment zone; and (k) passing the H₂S-rich amine solution through a regeneration column for producing a lean amine solution for contacting in step (f).

26. The process of claim 6, wherein the separated liquid product from the high pressure separator is let down in pressure to produce a low pressure liquid and gas stream.

27. The process of claim 26, wherein the low pressure liquid and gas stream are separated in a low pressure separator to produce a low pressure hydrogen-rich gas stream.

28. The process of claim 27, wherein the low pressure hydrogen-rich gas stream is:

(i) compressed and chilled prior to entering the absorption zone of step (b) of claim 1 for co-processing; or (ii) chilled and contacted with a lean solvent stream comprised of $C_4$ to $C_5$ components present in the reactor effluent gas stream to produce a low pressure high-purity hydrogen recycle stream containing 90 to 99 mol % hydrogen.

* * * * *